(12) United States Patent
Greene

(10) Patent No.: US 6,212,874 B1
(45) Date of Patent: Apr. 10, 2001

(54) PROPULSION SYSTEM

(75) Inventor: Leonard M. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 0 days.

(21) Appl. No.: 09/305,202

(22) Filed: May 5, 1999

(51) Int. Cl.$^7$ ........................................................ F02C 3/14
(52) U.S. Cl. .............................................................. 60/39.35
(58) Field of Search ............................. 60/39.43, 39.161, 60/39.75, 39.36

(56) References Cited

U.S. PATENT DOCUMENTS 2,843,210 * 7/1958 Grove ................................. 170/135.4
3,240,018 * 3/1966 Bar ....................................... 60/39.75

* cited by examiner

Primary Examiner—Timothy S. Thorpe
Assistant Examiner—William Rodriguez
(74) Attorney, Agent, or Firm—Dougherty & Troxell

(57) ABSTRACT

A propulsion system or aircraft engine for a helicopter or other aircraft includes an aerodynamic pod with a forward facing inlet for receiving a flow of ram air and a rearwardly facing exhaust or outlet. The system also includes a vertical shaft and one or more rotatable turbine assemblies mounted on the vertical shaft. Each of the turbine assemblies includes an inner compressor section having a plurality of blades with a first pitch and an outer turbine section having a plurality of blades at a reverse pitch. The compressor and turbine sections both forming part of a single disk or wheel. The system also includes a fuel injector for injecting fuel into the combustion chamber and an igniter for igniting the fuel air mixture within the chamber. A housing or channel directs the ram air through an angle of about 90° and through the compressor section and into the combustion chamber. The combustion chamber is constructed and arranged to direct the expanding fuel air mixture through the outer turbine section and out of the rearwardly directed exhaust or outlet.

13 Claims, 3 Drawing Sheets

PROPULSION SYSTEM

FIELD OF THE INVENTION

The present invention relates to a propulsion system for an aircraft or the like and more particularly to a tip mounted gas turbine engine for a helicopter.

BACKGROUND FOR THE INVENTION

Rotary winged aircraft or helicopters as they are more common known typically include a plurality of wings or blades commonly referred to as rotors which rotate about a shaft or mast. Such aircraft also include propulsion means such as a jet engine for rotating the rotors.

Helicopters have also been powered by the thrust of ram jets which are located at the tips of rotors or blades. For example, a Hiller Model H-J Hornet, a small two-place ram jet powered helicopter became the first ram jet powered unit to be certified in the United States and also the first C.A.A. approved tip mounted power plant for helicopters.

However, the use of tip mounted ram jets has not proven to be very useful because the ram jets are inefficient at the speeds that can be achieved at the tip of the rotor or blade. Both from a strength standpoint and from a shock wave standpoint, the speed is limited. The problem is that the ram compressor is less than the impact pressure because the airflow is not stopped (as it would be on impact), but instead can only be slowed down to the velocity needed to support the flame and exhaust velocity that gives thrust to the jet.

Another approach to a turbine engine which is mounted at the tip ends of helicopter rotor blades is disclosed in the U.S. patent of R. K. Grove No. 2,843,210. As disclosed therein, an angle mounted tip engine for aircraft sustaining rotors includes a vertical shafted power mechanism. The axis of th e vertical power shaft inclines slightly forward in terms of its translatory direction of orbital motion. The angle mounted tip engine also includes vertically spaced apart compressor and turbine members wherein the turbine member includes hollow stator vanes which are cooled by a stream of air conducted by a U-shaped conduit which bleeds off compressed air from the compressor member.

A more recent development is disclosed in my allowed copending application Ser. No. 08/939,715 entitled Helicopter Rotor Tip Jet. In that application, a helicopter includes a rotary wing and a ram jet engine mounted at the outer tip of the rotor for propelling the rotor a round the mast. The rotor or rotary wing also includes air inlet means at a distance from its tip and means for directing a flow of air which is subjected to centrifugal force through the rotor and into the ram jet engine to thereby increase the thrust of the ram jet engine.

It is presently believed that there may be a commercial market for an improved propulsion system in accordance with the present invention. There may be a commercial demand for such systems for use as a tip mounted gas turbine engine for a helicopter. The engine in accordance with the present invention are believed to be of relatively compact size with a relatively shallow aerodynamic design.

In addition, the propulsion system or engine in accordance with the present invention incorporates a vertically shafted power mechanism with one or more coaxial compressors and turbine sections and are constructed and arranged in a manner which should minimize any twisting moment on the rotor blade.

BRIEF SUMMARY OF THE INVENTION

In essence, the present invention contemplates a propulsion system or aircraft engine which is particularly applicable for use on the tip of a helicopter rotor. The system or engine includes an aerodynamic pod or housing with a forward and rear portion and a longitudinal axis. A forwardly facing inlet in the forward portion of the pod is adapted to receive a flow of ram air and to direct the ram air into and through the engine. In a preferred embodiment of the invention, the ram air flows along the longitudinal or horizontal axis as it passes through the inlet. The engine also includes an exhaust outlet in a rear portion thereof which in the preferred embodiment lies on or near its longitudinal axis. A generally vertical shaft is disposed within the housing transversely of the longitudinal axis. One or more gas turbine assemblies are disposed on the vertical shaft for rotation thereabout. Each of the gas turbine assemblies or units include a coaxial compressor and turbine rotor which are formed on a single disk or wheel. For example, in a preferred embodiment of the invention each turbine assembly includes a single disk or wheel having a compressor rotor or section including a plurality of blades with a first pitch on an inner portion thereof and a turbine rotor or section with a plurality of blades with a reverse pitch on an outer portion of the disk. The system also includes a combustion chamber downstream from the compressor, and means for injecting fuel into the combustion chamber. Means for igniting the fuel air mixture are also provided within the combustion chamber in a conventional manner. Means such as an inner housing are also provided for redirecting the ram air through a turn of about 90° and through the compressor rotor and into the combustion chamber. Additional means are provided for directing gases from the ignited fuel air mixture through the turbine rotor and through a nozzle and out of the outlet.

The invention will now be described in connection with the accompanying drawings wherein like reference numerals have been used to designate like parts.

DESCRIPTION OF THE PREFERRED EMBODIMENTS OF THE INVENTION

Figure 1:
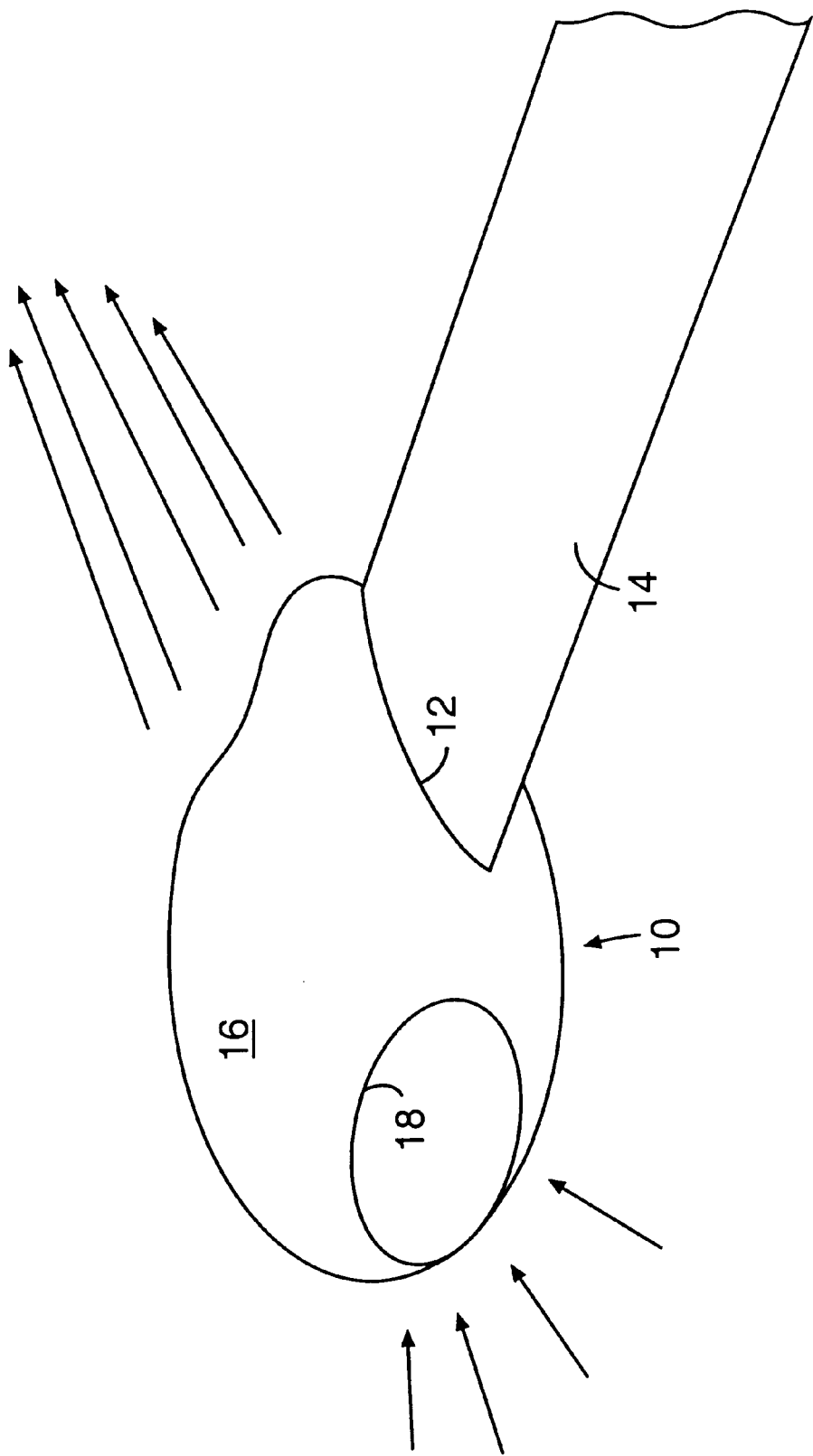
FIG. 1 is a perspective view of a propulsion system in accordance with the present invention as mounted on the tip of a helicopter rotor.

As shown in FIG. 1 a propulsion system or gas jet engine 10 is mounted on the outer tip 12 of a helicopter rotor or blade 14. The opposite end of the blade (not shown) is fixed to and rotates about a mast in a conventional manner.

Figure 2:
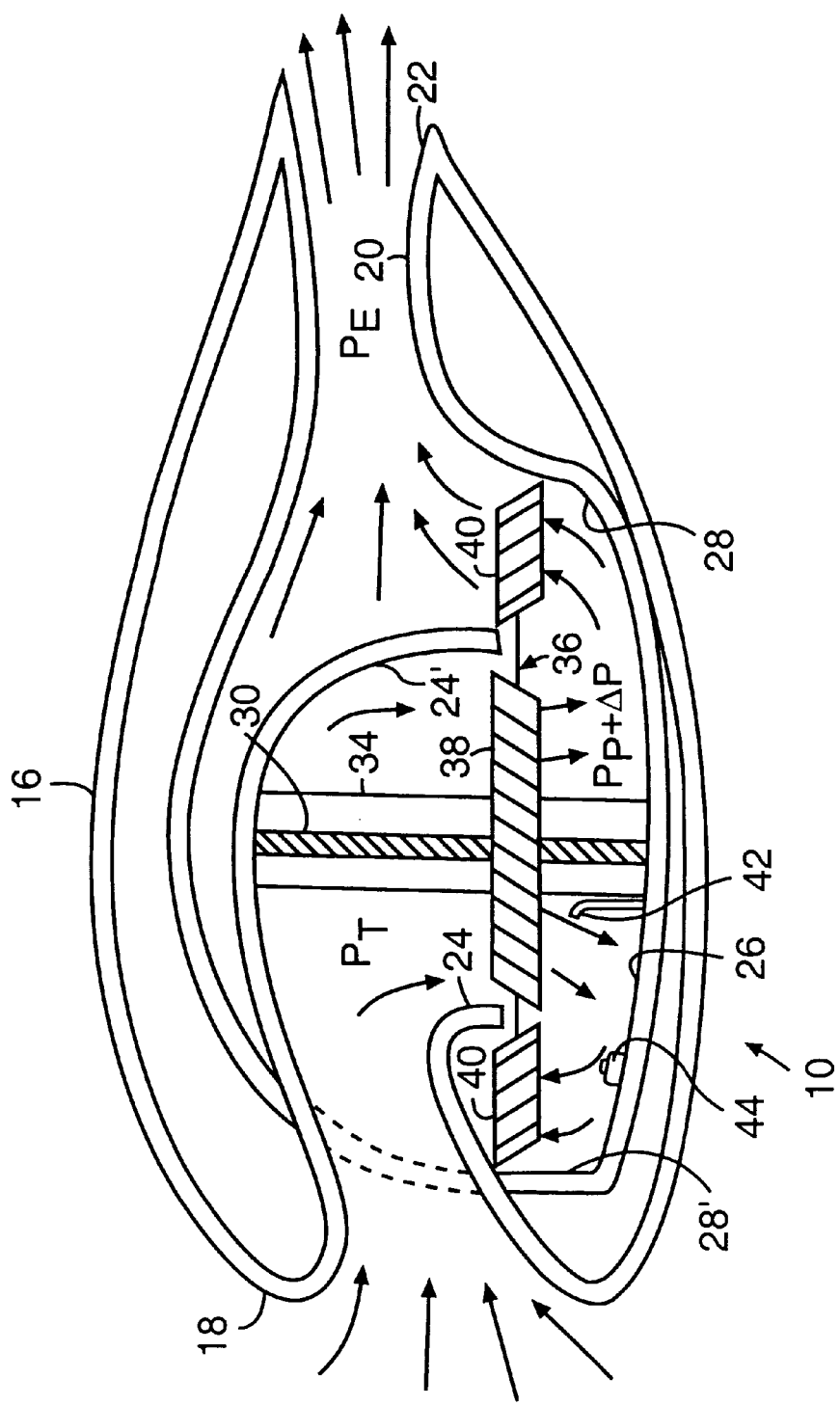
FIG. 2 is a schematic view of a propulsion system in accordance with a first embodiment of the invention; and, FIG. 3 is a schematic view of a propulsion system in accordance with a second embodiment of the invention.

The engine 10 according to a first embodiment of the invention is shown in more detail in FIG. 2. As illustrated therein, the engine 10 includes an outer housing 16 which has an aerodynamic elongated shape with an air intake 18 in a forward portion thereof. The engine 10 also includes an exhaust nozzle 20 and outlet 22 in a rear portion of the engine 10. The exhaust nozzle 20 is generally axially aligned with the air intake 18.

As illustrated, the engine 10 also includes a first inner housing 24, 24' which forms an air channel which directs a flow of ram air through a turn of about 90° and into a combustion chamber 26. A second inner housing 28, 28' defines or forms the combustion chamber 26 and is constructed and arranged to direct the burning fuel air mixture out of the combustion chamber 26 and toward the nozzle 20 and the outlet 22.

The engine 10 includes a vertical shaft 30 which is disposed transversely of the longitudinal axis of the engine 10. The shaft 30 is preferably surrounded by a protective jacket or shield 34 which may be of a conventional design and material as will be well understand by a person of ordinary skill in the art.

A turbine assembly 36 includes a rotatable wheel or disk with an inner compressor section 38 and an outer turbine section 40 for rotation about the vertical shaft 30. As shown, the compressor section 38 and turbine section 40 are part of a single wheel or disk. The compressor section 38 includes a plurality of vanes or blades at a first pitch while the turbine section 40 includes a plurality of vanes or blades at a second or reverse pitch.

As illustrated in FIG. 2, a fuel injector 42 and igniter 44 are shown schematically but may be of any conventional design and arrangement as will be well understood by the person of ordinary skill in the art.

In a preferred embodiment of the invention, the engine 10 lies along a generally horizontal axis and includes the air intake 18, nozzle 20 and outlet 22 which are generally axially aligned. As ram air passes through the intake 18 it is channeled or directed through a substantial angle of about 90° by the housing 24–24'. The ram air at a pressure of $P_t$ passes through the compressor section 38 of the turbine assembly 36 and into the combustion chamber 26. The compressor section 38 receives ram air through an upwardly open bell mouth defined by the housing 24, 24'. The air inducted through the inlet for intake 18 is directed through the compressor section 38 and into combustion chamber 26 at a pressure of $P_r$. As will be described hereafter, the ram air is directed through one or more stages of compressor sections.

Fuel is injected into the combustion chamber and into the flow of air passing through the compressor by the fuel injector 42 and is ignited by the igniter 44. The fuel burns in the compressed air atmosphere and the products of combustion $P+\Delta P$ are passed through the turbine section 40 which drives the compressor section 38. The expanding gas is then passed through the nozzle 20 at a pressure of Pe and out of the outlet 22 in a conventional manner.

Figure 3:
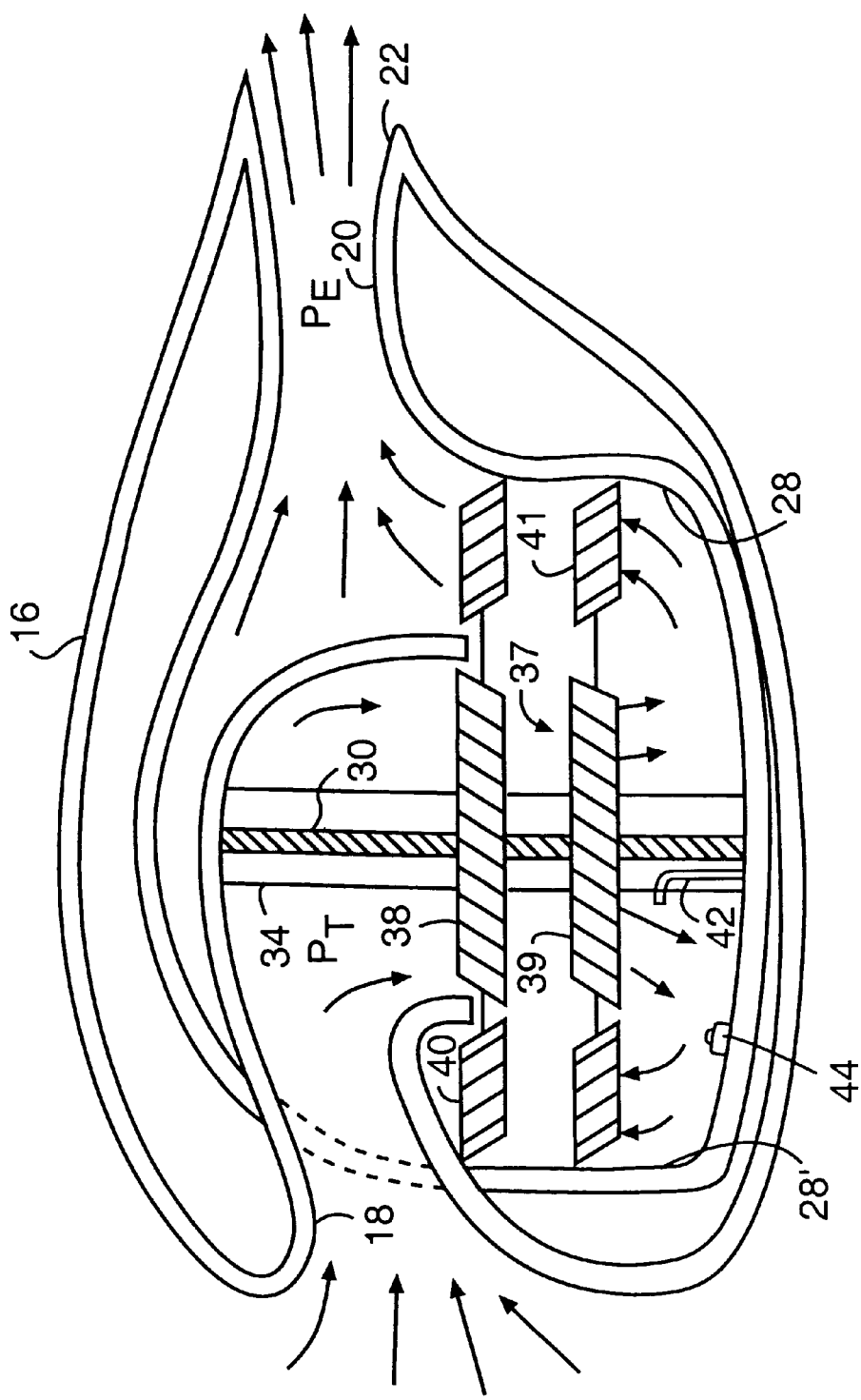

As illustrated in FIG. 3, a second embodiment of the invention includes a second turbine assembly 37. The second turbine assembly includes an inner compressor section 39 and an outer turbine section 41. As in the first embodiment of the invention, the compressor section 39 and turbine section 41 each include a plurality of vanes or blades as in a conventional turbine and, as in the first embodiment of the invention, the pitch of the blades or vanes in the compressor section 39 and turbine section 40 are reversed with respect to one another.

While the invention has been described in connection with its preferred embodiments, it should be recognized that changes and modifications may be made therein without departing from the scope of the claims.

What is claimed is:

1. A propulsion system comprising an aerodynamic housing having a longitudinal axis and a forwardly facing inlet for receiving a flow of ram air along the longitudinal axis, said housing also including a rearwardly facing outlet, a shaft disposed in said housing transversely of said longitudinal axis and a gas turbine assembly including a single disk having an inner compressor section and an outer turbine section for rotation about said shaft in a common plane, a combustion chamber on one side of said gas turbine assembly and within said housing and means for injecting fuel into said combustion chamber and means for igniting the fuel within said combustion chamber, means within said housing for redirecting the ram air through a turn of about 90°, through said inner compressor section and into said combustion chamber and means within said housing for directing the expanding gases and ram air through said outer turbine section and out of said outlet.

2. A propulsion system according to claim 1 which includes separator means within said housing for separating said inner compressor section and said outer turbine section.

3. A propulsion system according to claim 2 in which said compressor section includes a plurality of blades with a first pitch and in which a turbine section includes a plurality of blades at a reverse pitch.

4. A propulsion system according to claim 3 which includes a protective jacket around said shaft.

5. A propulsion system according to claim 1 which includes a plurality of turbine assemblies disposed on said shaft and where each of said assemblies includes a single disk having an inner compressor section and an outer turbine section.

6. A propulsion system comprising an aerodynamic pod having a forward facing inlet for receiving a flow of ram air and a rearwardly facing exhaust, a shaft disposed within said housing transversely of said inlet and a rotatable disk including an inner compressor section and an outer turbine section disposed on said shaft for rotation thereabout, a combustion chamber on one side of said compressor and turbine sections within said pod and means for injecting fuel into said combustion chamber and means for igniting the fuel without said combustion chamber, means within said pod for directing the ram air through an angle of up to about 90° and through said compressor section and into said combustion chamber and means for channeling exhaust gases formed from said ram air and ignited fuel through said outer turbine section of said disk and out of said exhaust.

7. A propulsion system according to claim 6 in which said inner compressor section and outer turbine section each include a plurality of blades and in which the blades in said inner compression section are at a first pitch and in which the blades of said outer turbine section are at a reverse pitch.

8. A propulsion system according to claim 7 which includes a plurality of turbine assemblies.

9. A propulsion system comprising an aerodynamic pod having forward and rear portions disposed along a horizonal axis, said pod defining an inlet in said forward portion for receiving a flow of ram air which flows into said pod in the general direction of a horizontal axis and an outlet in said rear portion of said pod, a vertical shaft disposed within said pod and a gas turbine unit including a single wheel having coaxially disposed compressor and turbine rotors mounted on said shaft for rotation in a generally horizontal plane, a combustion chamber disposed on one side of said compressor and turbine rotors within said pod and downstream from said compressor rotor and means within said pod for redirecting the ram air through a turn of about 90° through said compressor rotor and into said combustion chamber, means for injecting fuel into said combustion chamber rearwardly of said compressor rotor and ignition means for igniting the fuel and means within said pod for directing the expanding gases through the turbine rotor and out of said outlet.

10. A propulsion system according to claim 9 in which said compressor rotor includes a plurality of blades at a first pitch and in which said turbine rotor includes a plurality of blades at a different pitch.

11. A propulsion system according to claim 10 which includes separator means within said pod for separating the flow of ram air from the expanding gases flowing out of said combustion chamber.

12. A propulsion system according to claim 11 which includes a protective jacket around said shaft.

13. A propulsion system according to claim 11 which includes a plurality of gas turbine units disposed on said shaft.

* * * * *